3,799,854
METHOD OF ELECTRODEPOSITING CATIONIC COMPOSITIONS

Robert D. Jerabek, Glenshaw, Pa., assignor to PPG Industries, Inc., Pittsburgh, Pa.
No Drawing. Filed June 19, 1970, Ser. No. 47,917
Int. Cl. B01k 5/02; C23b 13/00
U.S. Cl. 204—181                                    17 Claims

ABSTRACT OF THE DISCLOSURE

It has been found that aqueous coating compositions comprising a blocked organic polyisocyanate and an amine group containing resin can be electrodeposited. These compositions deposit on the cathode to provide coatings having excellent properties.

BACKGROUND OF THE INVENTION

Electrodeposition as a coating application method involves the deposition of a film forming material under the influence of an applied electrical potential, and has become of increasing commercial importance. Along with the increased use of such methods has been the development of various compositions which provide more or less satisfactory coatings when applied in this manner. However, most conventional coating techniques do not produce commercially usable coatings, and electrodeposition of many coating materials, even when otherwise successful, is often attended by various disadvantages such as non-uniform coatings and by poor throw power, i.e., the ability to coat areas of the electrode which are remote or shielded from the other electrode. In addition, the coatings obtained are in many instances deficient in certain properties essential for their utilization in certain applications for which electrodeposition is otherwise suited. In particular, properties such as corrosion resistance and alkali resistance are difficult to achieve with the resins conventionally employed in electrodeposition processes, and many electrodeposited coatings are subject to discoloration or staining because of chemical changes associated with electrolytic phenomena at the electrodes and with the types of resinous materials ordinarily utilized. This is especially true with the conventional resin vehicles used in electrodeposition processes which contain polycarboxylic acid resins neutralized with a base; these deposit on the anode and because of their acidic nature tend to be sensitive to common types of corrosive attack, e.g., by salt, alkali, etc. Further, anodic deposition tends to place the uncurred coating in proximity to metal ions evolved at the anode, thereby causing staining with many coating systems.

In U.S. Pat. No. 3,995,531, as well as in the Official Digest, February 1960, pages 213 through 221, there is disclosed a polyurea coating which is the baked product of a copper polyisocyanate and a polyamide amine resin. resin.

DSECRIPTION OF THE INVENTION

It has now been found that aqueous coating compositions comprising a capped or blocked organic polyisocyanate and an amine group containing resin may be electrodeposited on a cathode to produce coatings with highly desirable properties, including alkali resistance and resistance to staining.

The capped or blocked isocyanate which may be employed in the compositions of the invention may be any isocyanate where the isocyanate groups have been reacted with a compound so that the resultant capped isocyanate is stable to amine groups at room temperature but reactive with amine groups at elevated temperatures, usually between about 200° F. and about 600° F.

In the preparation of the blocked organic polyisocyanate, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-tolylene, or mixtures thereof, 4,4'-toluidine, and 1,4-xylylene diisocyanates; the nuclear substituted aromatic compounds such as dianisidine diisocyanate, 4,4'-diphenylether diisocyanate and chloro-diphenylene diisocyanate; the triisocyanates such as triphenyl methane-4,4',4''-triisocyanate, 1,3,5-triisocyanate benzene and 2,4,6-triisocyanate toluene; and the tetra-isocyanates such as 4,4'-diphenyl-dimethyl methane-2,2'-5,5'-tetraisocyanate; the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate terminated prepolymers may be simple polyols such as glycols, e.g., ethylene glycol and propylene gycol, as well as other poyols such as glycerol, trimethylolpropane, hexanetriol, pentraerythritol, and the like, as well as monoethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxy-terminated polyethers and can be linear or branched. Examples of polyethers include polyoxyethylene glycol having a molecular weight of 1540, polyoxypropylene glycol having a molecular weight of 1025, polyoxytetramethylene glycol, polyoxyhexamethylene gycol, polyoxynonamethylene glycol, poyoxydecamethylene glycol, polyoxydodecamethylene glycol and mixtures thereof. Other types of poyoxyalkylene glycol ethers can be used. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylpropane, 1,2,6-hexanetriol, polypentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic or aromatic alkyl monoalcohol may be used as a blocking agent in accordance with the present invention, such as, for example, aliphatic alcohols, such as methyl, ethyl, chloroethyl, propyl, butyl, amyl, hexyl, heptyl, octyl, nonyl, 3,3,5-trimethylhexanol, decyl, and lauryl alcohols, and the like; the cycloaliphatic alcohols such as, for example, cyclopentanol, cyclohexanol, and the like, the aromatic-alkyl alcohols, such as, phenylcarbinol, methylphenylcarbinol, and the like. Minor amounts of even higher molecular weight relatively non-volatile monoalcohols may be used, if desired, to serve as plasticizers in the coatings provided by this invention.

Additional blocking agents include hydroxyl amines such as ethanolamine and oximes such as methylethyl ketone oxime, acetone oxime and cyclohexanone oxime.

The organic polyisocyanate-blocking agent adduct is formed by reacting a sufficient quantity of alcohol with the organic polyisocyanate to insure that no free isocyanate groups are present. The reaction between the organic polyisocyanate and the blocking agent is exothermic; therefore, the polyisocyanate and the blocking agent are preferably admixed at temperatures no higher than 80° C. and, preferably, below 50° C. to minimize the exotherm effect.

As previously stated, the resin employed in the composition and method of this invention is a coating composition containing an aqueous dispersion prepared from an organic polyisocyanate and an alcohol with a compound having a primary and/or secondary amine group to form a room temperature stable coating composition.

The compound containing primary and/or secondary amine groups may be any suitable compound having such available groups. Preferably the compound (including mixtures of compounds, generally referred to as organic resinous material) should have molecular weights of from about 1000 to about 10,000.

Particularly suitable compounds having available amine groups are the polyamide resins which may have terminal reactive primary amine groups and/or reactive secondary amine groups spaced along their molecules.

Polyamide resins may be produced by a condensation reaction between dimerized fatty acids, such as dimerized linoleic acid, with lower aliphatic polyamines, such as, for example, ethylene diamine or diethylene triamine, so that the final product will have available amine groups. The more highly functional amines, such as, diethylene triamine, are preferred because the polyamide resins produced by a condensation reaction between a dimerized fatty acid and diethylene triamine provide resins having a lower melting point and have free amine groups spaced along the polymer. A suitable process for the manufacture of polyamide resins is disclosed in U.S. Pat. No. 2,450,940, which issued Oct. 12, 1948, to John C. Cowan et al., and assigned to the United States of America as represented by the Secretary of Agriculture. Theoretically, if the dimer is represented by HOOC—R—COOH and the diamine by $H_2N$—R'—$NH_2$, there results, by condensation, a theoretical intermediate represented by

HOOC—R—CONH—R'—$NH_2$

This molecule is highly functional and can react with other molecules of dimer acid and diamine as the reaction continues. A long chain results having a molecular weight of up to about 10,000 or more. By substituting a polyamine for the diamine, the condensation with dimer acid will yield polyamides which contain both primary and secondary amine groups spaced along the molecule.

Another class of amine group-containing resins which can be used are water-dispersed products made by reacting free carboxyl groups of a polycarboxylic acid group containing acrylic resins with an alkyleneimine or substituted alkyleneimine and neutralizing all or part of the resultant aziridine group-containing product with an acid to provide a product which is soluble or dispersible in water. The term "dispersed or solubilized" as used herein means dissolved in or dispersed in water so that the resin does not settle upon standing for a reasonable period and acts as a polyelectrolyte under introduced electric current.

Essentially any polycarboxylic acid group containing acrylic resins can be utilized in the invention. These acrylic resins may be broadly described as interpolymers of esters of unsaturated carboxylic acids, unsaturated carboxylic acids and at least one other ethylenically unsaturated monomer. The acid monomer of the interpolymer is usually acrylic or methacrylic acid but other ethylenically unsaturated monocarboxylic and dicarboxylic acids such as ethacrylic acid, crotonic acid, maleic acid or other acids up to about 6 carbon atoms can also be employed. Ordinarily the acid and ester each comprise about one percent to about 20 percent by weight of the interpolymer, with the remainder being made up of one or more co-polymerizable ethylenically unsaturated monomers. Most often used are the alkyl acrylates such as ethyl acrylate, butyl acrylate, 2-ethylhexyl acrylate, and the like; the alkyl methacrylates such as methyl methacrylate, butyl methacrylate, lauryl methacrylate, etc., and the vinyl aromatic hydrocarbons such as styrene and vinyl toluene, but others can also be utilized.

Of particular interest are a group of carboxylic acids containing acrylic resins which also contain hydroxyl groups, for example, those described in U.S. Pat. No. 3,403,088, the resin disclosure of which is hereby incorporated by reference. These interpolymers are essentially described above, but in addition contain from about one percent to about 20 percent by weight of a hydroxyalkyl ester of acrylic acid and methacrylic acid or other alpha,beta-ethylenically unsaturated carboxylic acid, for example, hydroxy esters of acrylic or methacrylic acid wherein the hydroxyalkyl group contains up to 5 carbon atoms such as 2-hydroxyethyl acrylate, 2-hydroxypropyl acrylate, 3-hydroxypropyl acrylate, 2-hydroxyethyl methacrylate, 2-hydroxypropyl methacrylate, 3-hydroxypropyl methacrylate, 4-hydroxybutyl methacrylate. Corresponding esters of other unsaturated acids, for example, acrylic acid, crotonic acid, maleic acid, and similar acids of up to 6 carbon atoms can also be employed.

Another group of acrylic resins containing carboxyl groups are those which contain etherified methylated derivatives of acrylamide such as those in U.S. Pat. No. 3,247,139, the resin disclosure of which is hereby incorporated by reference. These groups may be introduced into the polymer by employing an acrylamide in the preparation of the interpolymer and then subsequently reacting the resultant amide group with an aldehyde and an alcohol, for example, formaldehyde and butanol; or by employing as a monomer the pre-formed etherified methylated derivatives of acrylamide such as described in U.S. Pat. No. 3,079,434 which is hereby incorporated by reference.

It is desirable that the interpolymer contain in polymerized form from about 2 percent to about 50 percent of said aldehyde-modified carboxylic acid amide. The remainder of the interpolymer may be made up as set forth above.

The interpolymers described above were produced under the conditions and with catalysts conventionally used in making acrylic polymers. For example, if a catalyst is usually present and the polymerization temperature was generally between about 65° C. and 130° C., or it is desirable to control molecular weight or to produce a relatively low molecular weight interpolymer, there may be employed a chain-transfer agent such as a mercaptan to achieve this result.

Various alkylenimines and substituted alkylenimines can be used to modify the acidic groups in the above polycarboxylic acid resins. These correspond generally to the formula:

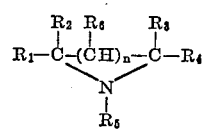

where $R_1$, $R_2$, $R_3$, $R_4$ and $R_5$ are each either hydrogen alkyl, such as methyl, ethyl, propyl, or the like, having for example, up to about 20 carbon atoms; aryl, such as phenyl or the like; alkaryl, such s tolyl, xylyl or the like; or aralkyl, such as benzyl, phenethyl or the like. $R_6$ in the above formula is hydrogen or a lower alkyl radical usually having not more than about 6 carbon atoms, and $n$ is 0 or 1.

The groups designated by the above formula include substituted radicals of the classes indicated, including substituents such as cyano, halo, amino, hydroxy, alkoxy, carbalkoxy, and nitrile. The substituted groups may thus be cyanoalkyl, haloalkyl, aminoalkyl, hydroxyalkyl, alkoxyalkyl, carbalkoxyalkl, and similar substituted derivatives or aryl, alkaryl and aralkyl groups where present. It will be seen that compounds containing certain combinations of the above groups cannot be obtained because of factors such as steric hindrance or intra-molecular interaction. For this reason, in most of the compounds of the class described, one and usually several of the groups designated by $R_1$ through $R_6$ will represent hydrogen. However, the efficacy of the various imines within the above formula does not depend upon the particular nature of any of the substituents and thus, beneficial results are obtained with interpolymers modified by any of those compounds within the above class.

To exemplify the compounds which can be used, examples of imines within the scope of the formula set forth above are as follows:

Ethyleneimine (aziridine)
1,2-propyleneimine (2-methylaziridine)
1,3-propyleneimine (azetidine)
1,2-dodecylenimine (2-octylaziridine)
Dimethylethylenimine (2,2-dimethylaziridine)
Tolyl ethylenimine (2-(4-methylphenyl)aziridine)
Benzyl ethylenimine (2-phenylmethylaziridine)
1,2-diphenylethylenimine (2,2-diphenylaziridine)
2-aminoethylethylenimine (2-(2-aminoethyl)aziridine)
2-(3-chloropropyl)ethylenimine (2-(3-chloropropyl) aziridine)
2-(2-methoxyethyl)ethylenimine (2-(2-methoxyethyl) aziridine)
Dodecyl 2-aziridinylcarboxylate
2-(2-carbethoxyethyl)ethylenimine (2-(2-carbethoxyethyl)aziridine)
N-butylethylenimine (1-butylaziridine)
N-(2-aminoethyl)ethylenimine (1-(2-aminoethyl) aziridine)
N-(cyanoethyl)ethylenimine (2-(cyanoethyl)aziridine)
N-phenylethylenimine (1-phenylaziridine)
N-(p-chlorophenyl)ethylenimine (1-(4-chlorophenyl aziridine)

Because of their availability and because they have been found to be among the most effective, the preferred imines are alkylenimines having 2 to 4 carbon atoms, and especially ethylenimine and 1,2-propylenimine.

The reaction with the imine takes place upon admixing the imine and the carboxyl-containing material and heating to moderate temperatures, say 50° C. to 150° C., although higher or lower temperatures can be used, depending upon the desired reaction time.

The amount of amine reacted with the free carboxyl groups of the acrylic resins is that amount sufficient to render the resin cationic in character, that is, transportable to a cathode when acid-solubilized. Preferably, substantially all of the acidity in the resin is reacted with imine.

The reaction with the imine is preferably carried out during or after the polymerization to produce the polycarboxylic acid resin. While often the imine reaction is carried out with the polycarboxylic acid resin as such, it can also be carried out concurrently with the polymerization reaction, or even with the polycarboxylic acid itself.

The polyisocyanate-blocking agent adduct is preferably admixed with the compound containing primary and/or secondary amine groups in ratios of from about 0.5 to about 2.0 urethane groups for each amine group. When the mixture is heated to curing temperatures, it is theorized that a urethane-amine complex is formed prior to the splitting out of the alcohol, which prevents the loss of monomeric polyisocyanate.

The capped isocyanate amine resin mixture is electrodeposited on a suitable substrate and cured at elevated temperatures, such as from about 250° F. to about 600° F. At these higher temperatures, the reactivity of the amine groups is such to enable it to break the urethane link of the adduct and react with the freed NCO groups to form a substituted urea. The alcohol released may either volatilize or remain in the mixture as a plasticizer, depending essentially on its boiling point. Furthermore, it has been found that isocyanate groups are liberated in a manner which indicates that in addition to the amine groups, products of the amine and isocyanate reaction break the urethane bond of the adduct.

Aqueous compositions containing the above components are highly useful as coating compositions particularly suited to application by electrodeposition. It is not always necessary to add a neutralizing agent to the product in order to obtain a suitable aqueous composition, although an acid or acidic neutralizing agent is more preferably added. It is desirable to electrodeposit these coatings from a solution having a pH between 3 and about 9. The addition of acid thus is often useful to achieve the desired pH.

Neutralization of these products is accomplished by the reaction of all or part of the amino groups by an acid, for example, formic acid, acetic acid, or phosphoric acid or the like. The extent of neutralization depends upon the particular resin and it is only necessary that sufficient acid be added to solubilize or disperse the resin if desired.

The concentration of the product in water depends upon the process parameters to be used and is in general not critical, but ordinarily the major proportion of the aqueous composition is water, e.g., the composition may contain one to 25 percent by weight of resin. In most instances, a pigment composition and, if desired, various additives such as anti-oxidants, surface active agents, and the like are included. The pigment composition may be of any conventional type, comprising, for example, one or more pigments such as iron oxides, lead oxides, strontium chromate, carbon black, titanium dioxide, talc, barium sulfate, cadmium yellow, cadmium red, chromic yellow and the like.

In electrodeposition processes employing the aqueous coating compositions described above, the aqueous composition is placed in contact with an electrically conductive anode and an electrically conductive cathode, with the surface to be coated being the cathode. Upon passage of electric current between the anode and the cathode, while in contact with the bath containing the coating composiion, an adherent film of the coating composition is deposited on the cathode. This is in contrast to processes utilizing polycarboxylic acid resins which deposit on the anode, and many of the advantages described above are in large part attributed to this cathodic deposition.

The conditions under which the electrodeposition is carried out are in general similar to those used in electrodeposition of other types of coatings. The applied voltage may be varied greatly and can be, for example, as low as one volt or as high as several thousand volts, although typically between 50 volts and 500 volts. The current density is usually between about 1.0 ampere and 15 amperes per square foot, and tends to decrease during electrodeposition.

The method of the invention is applicable to the coating of any electrically conductive substrate, and especially metals such as steel, aluminum, copper or the like.

After deposition, the coating is cured at elevated temperatures by any convenient method such as in baking ovens or with banks of infrared heat lamps. Curing temperatures are preferably from about 350° F. to about 425° F., although curing temperatures from about 250° F. to about 500° F., or even 600° F. may be employed if desired.

Illustrating the invention are the following examples, which, however, are not construed as limiting the invention to their details. All parts and percentages in the examples, as well as throughout this specification, are by weight unless otherwise specified.

Example I

Sixty parts by weight of anhydrous ethyl alcohol, to which one drop of dibutyl tin dilaurate had been added, was blended slowly with 140 parts of a sucrose polyether polyol-toluene diisocyanate prepolymer possessing an isocyanate equivalent weight of 140, prepared by reacting 215 parts of a polyol derived from 1 mole of sucrose, 11 moles propylene oxide and 4 moles ethylene oxide with 78.5 parts of TDI, and the batch cooled externally. After the exotherm subsided, another 40 parts of ethyl alcohol were added to yield an alcohol blocked polyisocyanate. Twenty-four parts of this blocked polyisocyanate were blended with 25 parts of polyamide-amine possessing an amine equivalent weight of 250 [Versamid 115—polyamide resin which is the condensation product of dimerized linoleic acid and diethylene triamine. The polyamide resin has an amine value of from about 210 to about 230 and a viscosity of about 500 to about 750 poises at 40° C. (Brookfield Viscometer #6 spindle, 4 r.p.m.)]. The mixture then neutralized with 2.9 parts of glacial acetic acid and next reduced with deionized water to yield 550 parts of cationic resin dispersion possessing a pH of 7.35. A zinc phosphated steel panel cathode was electrocoated in this dispersion for 90 seconds at 150 v., the panel rinsed with water and then baked for 20 minutes at 385° F. to yield an acetone-resistant coating of 0.4 to 0.5 mil film thickness, possessing a pencil hardness of 2H.

Example II

Twenty parts of tert-butyl alcohol containing one drop of dibutyl tin dilaurate were blended with 35 parts TDI prepolymer described in Example I, and warmed to initiate the reaction. A clear, solid, alcohol-blocked polyisocyanate resulted upon allowing the mixture to age for 24 hours in a closed container. Ten parts of ethylene glycol monobutyl ether was used to dissolve 21.4 parts of the tert-butyl alcohol blocked polyisocyanate and the solution then blended with 25 parts of polyamide-amine described in Example I (Versamid 115). After neutralization with 4.0 parts of glacial acetic acid, the dispersion was reduced with deionized water to yield a total of 550 parts of cationic polyamide-amine based dispersion possessing a pH of 6.1. This aqueous dispersion was electrodeposited upon a zinc phosphated steel panel cathode for 90 seconds at 150 volts. After rinsing with water, the panel was baked for 18 minutes at 385° F. to yield a polyurea film of 0.4 mil thickness and 2H pencil hardness.

Example III

To 143 parts by weight of 2-ethylhexanol containing one drop of dibutyl tin dilaurate was added slowly with agitation 87.1 parts of toluene diisocyanate, cooling when necessary, to maintain the mixture temperature below 100° C. Twenty-three parts of this 2-ethylhexanol-blocked polyisocyanate was blended with 25 parts of polyamide-amine described in Example I (Versamid 115), neutralized with 4 parts of 36 percent aqueous acetic acid solution, and then reduced with deionized water to yield 700 parts of aqueous cationic polyamide-amine dispersion possessing a pH of 8.2. This dispersion was electrodeposited at 100 volts for 90 seconds upon a zinc phosphated steel panel cathode, the panel rinsed with water, and baked for 10 minutes at 360° F. to yield a polyurea film of 0.9 mil thickness and HB pencil hardness.

Example IV

Thirty-four and one-half parts by weight of 2-ethyl hexanol blocked TDI of Example III were blended with 15 parts of polyamide-amine possessing an amine equivalent weight of 600 (Versamid 100) and 13 parts of polyamide-amine possessing an amine equivalent weight of 175 [Versamid 125—polyamide resin which is the condensation product of dimerized linoleic acid and diethylene triamine and has an amine value of from about 290 to about 320 and a viscosity of about 80 to about 120 poises at 40° C. (Brookfield Viscometer #6 spindle, 4 r.p.m.)]. The mixture was neutralized with 8.0 parts of 36 percent aqueous acetic acid solution and diluted to a total of 1000 parts by weight with deionized water. The resultant aqueous cationic polyamide-amine dispersion showed a pH of 7.4. This dispersion was electrodeposited upon an untreated steel panel cathode for 6 seconds at 300 volts, the panel rinsed with water, and baked 10 minutes at 360° F. to yield a hard polyurea coating possessing a film thickness of 0.25 mil.

Example V

A blocked polyisocyanate was prepared by slowly adding 133 parts by weight of polymethylene polyphenylisocyanate possessing an isocyanate equivalent weight of 133.5 (PAPI) to 143 parts of 2-ethyl hexanol containing 2 drops of dibutyl tin dilaurate with agitation and cooling. This blocked polyisocyanate, 27.6 parts, was blended with 10 parts of ethylene glycol monobutyl ether and 25 parts polyamide-amine described in Example I (Versamid 115). The blend was neutralized with 10 parts of 36 percent aqueous acetic acid solution and reduced with deionized water to yield 800 parts of an aqueous cationic resin dispersion possessing a pH of 6.9. When electrodeposited upon a zinc phosphated steel panel cathode at 100 v. for 90 seconds, the panel rinsed with water, and baked 10 minutes at 375° F., a smooth hard polyurea film of 0.9 mil film thickness was obtained.

Example VI

An amino alcohol blocked polyisocyanate was prepared by adding, with agitation and cooling, 87 parts of toluene diisocyanate to 129 parts of diethyl ethanolamine. To 10.8 parts of this blocked polyisocyanate was added and mixed 12.5 parts of polyamide-amine described in Example I (Versamid 115) and the mixture neutralized with 4 parts of 36 percent aqueous acetic acid solution. Thinning with deionized water to 400 parts by weight yielded an opalescent cationic resin dispersion possessing a pH of 8.9. This dispersion was electrodeposited upon a zinc phosphatized steel panel cathode for 90 seconds at 100 volts, yielding a smooth glossy film after rinsing with water and baking 10 minutes at 380° F., the film thickness was 0.3 mils and pencil hardness 2H.

Example VII

To 142 parts 2-ethyl hexanol and 129 parts diethyl ethanolamine containing 1 drop of dibutyl tin dilaurate was added 250 parts of diphenylmethane-4,4-diisocyanate slowly, with agitation at 110° C. The resultant blocked polyisocyanate 21 parts were blended with 25 parts of polyamide-amine described in Example I (Versamid 115) and the mixture neutralized with 5 parts of glacial acetic acid. Reducing with deionized water to 400 parts yielded a cationic resin dispersion possessing a pH of 7.0. This dispersion was electrodeposited upon a zinc phosphated steel panel cathode for 2 minutes at 100 volts to yield a mar resistant polyurea coating of 0.6 mil thickness after rinsing with water and baking for 20 minutes at 360° F.

Example VIII

The following pigment dispersion was prepared on a laboratory mill:

| | Parts |
|---|---|
| Red ion oxide | 2000 |
| Lead silicate | 375 |
| Strontium chromate | 125 |
| Cationic surfactant (Aerosol C–61) | 143 |
| Deionized water | 1007 |

Four 184.5 gram aliquots of this paste were each blended with 120.8 grams of 2-ethylhexanol blocked TDI prepared as per Example III along with 132 grams of polyamide-amine described in Example I (Versamid 115). Each was then neutralized with different acids, namely 26.4 grams 36% acetic, 25.9 grams benzoic, 21.1 parts dimethylol propionic, and 43.0 grams 36% mono-diethyl acid orthophosphate and then each reduced with deionized water to 40% non-volatile content. The resultant pigmented cationic resin dispersions were each reduced further to 10% non-volatile content with deionized water and electrodeposited on zinc phosphated steel panel cathodes at between 100 and 200 volts. After rinsing with water and baking 20 minutes at 375° F., the polyurea coated panels were scribed and exposed to salt spray for 1000 hours without surface rusting or rust creepage from the scribe lines.

Example IX

A blend of 200 parts of polyamide-amine (Versamid 115), 8.6 parts polyepoxide (Epon 828) and 12.5 parts ethylene glycol monobutyl ether was prepared and allowed to stand 24 hours for reaction. To this polyamide-amine partially-crosslinked with a polyepoxide was added 40 parts of 36% aqueous acetic acid. A separate pigment dispersion was then prepared in a laboratory mill, consisting of 112 parts of the above resin mixture, 4.3 parts cationic dispersant (Aerosol C-61), 308 parts deionized water, 165 parts red iron oxide, 15 parts strontium chromate, and 120 parts lead silicate. To a 100 part portion of this paste was added 52.3 parts of the above resin mixture, 39.5 parts of 2-ethyl hexanol blocked TDI of Example III, and 127.2 parts of deionized water. When reduced to 10 percent N.V. with deionized water, the cationic primer prepared displayed a pH of 6.8. Electrodeposition of the primer on steel panel cathodes, wither phosphated or untreated, yielded films of H to 2H hardness after rinsing with water and baking 30 minutes at 380° F. The films were outstanding in salt spray resistance when examined after 500 hours' exposure.

Example X

A maleinized tall oil fatty acid ester of a styrene-allyl alcohol resinous polyol was first prepared in laboratory glassware by esterifying 1203 grams of resinous polyol (Shell X450) with 1700 grams of tall oil fatty acids at a top temperature of 250° C. Using xylol as an azeotrope solvent to aid water removal. When an acid value of about 16 was reached, the batch was cooled, 250 grams maleic anhydride introduced and reheated to 225° C. and held for 2 hours. After a fifteen minute sparge with inert gas, the batch was again cooled to 120° C. and thinned with 339 grams of xylol. A 890 gram portion of this maleinized ester was placed in another flask equipped with agitation, external heating, thermometer and condenser, and treated with one gram of triethylamine and 13 grams water. After heating to 95° C. and holding about an hour to hydrolyze the anhydride groups present, 80 grams of ethylene diamine were introduced slowly. The batch was slowly heated to 165° C. after a trap was introduced into the condensing system and held about an hour to remove the water of reaction and xylol present. After sparging thirty minutes, the batch of polyamide-amine was cooled.

Twenty grams of the above polyamide-amine were blended with 7 grams of 2-ethylhexanol blocked TDI of Example III, and 2 grams of ethylene glycol monobutyl ether. After neutralization with 3 grams of 36% aqueous acetic acid, the mixture was diluted with deionized water to yield 400 grams of cationic resin dispersion. This dispersion was electrodeposited upon an untreated steel cathode panel at 125 v. for 90 seconds and the panel subsequently rinsed with water and baked for 20 minutes at 360° F. to yield a glossy adherent film.

Example XI

The amine group-containing resin employed in this example was an imine-modified acrylic resin containing 8.8 percent propylene imine, 13.7 percent methacrylic acid, 27.4 percent styrene and 50.1 percent butyl acrylate utilized as a 76 percent solution in Pent-Orone (4-methyl-4-methoxy-pentanone-2), viscosity 175,000 centipoises.

A pigment paste was prepared having a Hegman grind of 7+ containing 6000 parts red iron oxide, 375 parts lead silicate, 125 parts of strontinum chromate, 143 parts of a cationic surfactant (Aerosol C-61, a mixture of octadecyl amine and octadecyl guanidine salts of octadecyl carbamic acid reacted with ethylene oxide, 70 percent in isopropanol water mixture) and 1007 parts deionized water.

An electrodepositable composition was prepared containing:

| | Parts by weight |
|---|---|
| Pigment paste (above) | 137.5 |
| Acrylic resin (above) | 237.0 |
| Capped isocyanate (as in Example III) | 66.0 |
| Acetic acid (36 percent) | 28.0 |
| Deionized water, to reduce to 10% solids. | |

The pH of the electrodeposition bath was 6.0 with a specific conductivity of 1250 mohs. Zinc phosphatized steel panels were coated at 200 volts for two minutes. 0.8 mil film thickness, baked for 20 minutes at 400° F., pencil hardness 2H, impact resistance greater than 160 inch/lbs., a smooth gloss film. The coating withstood 250 hours salt spray with 2-3 mm. creepage from a scribe. 250 hour humidity results were excellent.

Similar results to those of the above examples are obtained by substituting therein various other amine resins or blocked polyisocyanates such as those hereinabove described, also variation in the procedure employed within limits discussed above can be used with satisfactory results.

According to the provisions of the patent statutes, there are described above the invention and what are now considered its best embodiments; however, within the scope of the appended claims, it is understood that the invention can be practiced otherwise than as specifically described.

I claim:

1. A method of electrocoating an electrically conductive surface serving as a cathode in an electrical circuit comprising said cathode, an anode and an aqueous electrodepositable composition wherein the electrodepositable composition comprises:
   (A) a solubilized synthetic polyamine resin and
   (B) a blocked polyisocyanate stable at ordinary room temperature in the presence of said polyamine resin and reactive with said polyamine resin at elevated temperatures.

2. A method as in claim 1 wherein (B) is the reaction product of an organic polyisocyanate and an aliphatic alkyl, cycloaliphatic alkyl, or aromatic alkyl monoalcohol; or a ketoxime or a hydroxylamine.

3. A method as in claim 2 wherein (B) is the reaction product of an organic polyisocyanate and an aliphatic alkyl, cycloaliphatic alkyl or aromatic alkyl monoalcohol.

4. A method as in claim 3 wherein (B) is the reaction product of an aliphatic alkyl monoalcohol and an organic polyisocyanate.

5. A method as in claim 1 wherein (A) and (B) are present in a ratio of about 0.5 to about 2.0 latent urethane groups per amine group.

6. A method as in claim 1 wherein the electrodepositable composition comprises:
   (A) an acid solubilized polyamine resin selected from the group consisting of polyamide-polyamine resins and imine-modified carboxylic acid group-containing acrylic resins, and
   (B) a blocked polyisocyanate stable at ordinary room temperature in the presence of said polyamine resin and reactive with said polyamine resin at elevated temperatures.

7. A method as in claim 6 wherein (B) is the reaction product of an organic polyisocyanate and an aliphatic alkyl, cycloaliphatic alkyl, or aromatic alkyl monoalcohol; or a ketoxime or a hydroxylamine.

8. A method as in claim 7 wherein (B) is the reaction product of an organic polyisocyanate and an aliphatic alkyl, cycloaliphatic alkyl or aromatic alkyl monoalcohol.

9. A method as in claim 8 wherein (B) is the reaction product of an aliphatic alkyl monoalcohol and an organic polyisocyanate.

10. A method as in claim 6 wherein (A) and (B) are present in a ratio of about 0.5 to about 2.0 latent urethane groups per amine group.

11. A method as in claim 1 wherein (A) is an acid-solubilized polyamide-polyamine which is the reaction product of a dimer fatty acid and a lower aliphatic polyamine.

12. A method as in claim 11 wherein (B) is the reaction product of an organic polyisocyanate and an aliphatic alkyl, cycloaliphatic alkyl, or aromatic alkyl monoalcohol; or a ketoxime or a hydroxylamine.

13. A method as in claim 12 wherein (B) is the reaction product of an organic polyisocyanate and an aliphatic alkyl, cycloaliphatic alkyl or aromatic alkyl monoalcohol.

14. A method as in claim 13 wherein (B) is the reaction product of an aliphatic alkyl monoalcohol and an organic polyisocyanate.

15. A method as in claim 11 wherein (A) and (B) are present in a ratio of about 0.5 to about 2.0 latent urethane groups per amine group.

16. A method as in claim 12 wherein the aliphatic alkyl monoalcohol is selected from ethanol, tert-butyl alcohol, 2-ethylhexanol and diethyl ethanolamine.

17. An article electrocoated by the method of claim 1.

References Cited
UNITED STATES PATENTS

| | | | |
|---|---|---|---|
| 3,455,806 | 7/1969 | Spoor | 204—181 |
| 3,477,977 | 11/1969 | Schnell et al. | 204—181 |
| 3,488,272 | 1/1970 | Frisch et al. | 204—181 |

HOWARD S. WILLIAMS, Primary Examiner

UNITED STATES PATENT OFFICE
CERTIFICATE OF CORRECTION

Patent No. 3,799,854                     Dated March 26, 1974

Inventor(s)  Robert D. Jerabek

It is certified that error appears in the above-identified patent and that said Letters Patent are hereby corrected as shown below:

Column 1, line 50, "uncurred" should read --uncured--; line 56 "Copper" should read --capped--; line 57, "resin." should be eliminated entirely; line 67, "isocyanate" (second occurrence) should read --isocyanato--.

Column 4, line 68, "s" should read --as--.

Column 5, line 4, "or" should read --of--; line 41, a closing parenthesis --)-- should be added after the word "chlorophenyl".

Column 9, line 4, "fur-" should read --further--; line 74, "Oronc" should read --Oxone--.

Signed and sealed this 17th day of September 1974.

(SEL)
Attest:

McCOY M. GIBSON JR.                        C. MARSHALL DANN
Attesting Officer                          Commissioner of Patents